United States Patent
Roeingh et al.

(10) Patent No.: US 7,549,647 B2
(45) Date of Patent: Jun. 23, 2009

(54) SEALING DEVICE

(75) Inventors: Konrad Roeingh, Hilchenbach (DE); Karl Keller, Hilchenbach (DE); Rolf Hücker, Kreuztal (DE)

(73) Assignee: SMS Demag AG, Düsseldorf (DE)

( * ) Notice: Subject to any disclaimer, the term of this patent is extended or adjusted under 35 U.S.C. 154(b) by 161 days.

(21) Appl. No.: 10/583,526

(22) PCT Filed: Nov. 11, 2004

(86) PCT No.: PCT/EP2004/012782

§ 371 (c)(1),
(2), (4) Date: Jun. 16, 2006

(87) PCT Pub. No.: WO2005/061139

PCT Pub. Date: Jul. 7, 2005

(65) Prior Publication Data

US 2007/0140601 A1    Jun. 21, 2007

(30) Foreign Application Priority Data

Dec. 16, 2003  (DE) ............................ 103 60 382

(51) Int. Cl.
*F16J 15/34* (2006.01)
*F16J 15/32* (2006.01)
*F16C 33/74* (2006.01)
*F16C 33/76* (2006.01)

(52) U.S. Cl. .................. 277/353; 277/394; 277/402; 277/551; 277/572; 384/147; 384/484; 384/485

(58) Field of Classification Search .......... 277/353, 277/394–395, 402, 423, 551, 572; 384/147, 384/484, 485

See application file for complete search history.

(56) References Cited

U.S. PATENT DOCUMENTS 4,679,801 A    7/1987    Poloni et al.

(Continued)

FOREIGN PATENT DOCUMENTS

DE    296 20 018    2/1998

(Continued)

*Primary Examiner*—Vishal Patel
(74) *Attorney, Agent, or Firm*—Friedrich Kueffner

(57) ABSTRACT

The invention relates to a sealing device for roller bearings, comprising a journal seal (4), which is arranged upstream on the roller-ball side of the annular seal (8) which is connected in a rigid manner to an annular projection (7) of the bearing housing (5). The sealing lip (18) of the sealing device is applied to the front side (10) of the roller (1) by means of a sealing contact. The aim of the invention is to improve the sealing device in such a manner that the sealing lip of the annular seal is barely impinged upon by cooling means mixed by impurities, making it long lasting and ensuring that no undesired water can penetrate into said outlet. According to the invention, an L-shaped profile (11), in the cross-section, is rigidly connected to the first side (12) thereof by means of the front side (14) of the roller (1), such that the sealing lip (18) is applied to areas of the first side (12); such that the second side (13) of the L-shaped annular profile (11) is sealed to the roller balls at a certain distance from the annular seal (8) and regions of the annular projection (7); and such that the annular projection (7) comprises an outlet groove (9) which is arranged on the outer side and is open towards the outside.

5 Claims, 1 Drawing Sheet

U.S. PATENT DOCUMENTS

| | | | |
|---|---|---|---|
| 4,910,987 A | | 3/1990 | Woodrow et al. |
| 5,421,591 A | * | 6/1995 | Katzensteiner .............. 277/550 |
| 6,146,020 A | * | 11/2000 | Innis, Jr. ..................... 384/486 |
| 6,217,219 B1 | | 4/2001 | Hoeting |
| 7,063,193 B2 | * | 6/2006 | Yoshida ....................... 192/35 |

FOREIGN PATENT DOCUMENTS

| | | |
|---|---|---|
| DE | 694 10 752 | 9/1998 |
| EP | 0 860 637 | 12/2001 |

\* cited by examiner

SEALING DEVICE

BACKGROUND OF THE INVENTION

The invention pertains to a sealing device for roll bearings with a neck seal, which is preceded on the roll barrel side by a ring seal, which is permanently connected to a ring-like extension of the bearing housing, the sealing lip of the ring seal resting with sealing contact against the end surface of the roll.

A sealing device of this type is known from, for example, DE 694 10 752 T2. During hard rolling operation, the ring seal shown here is continuously exposed to the coolant, which is laden with impurities, as a result of which the sealing lip has only a very short life-span. In addition, the opposing contact surface, that is, the end surface of the roll, is subjected to disproportionate wear by the impurities present in the coolant, so that this opposing contact side also has only a short life-span. The ring seals, furthermore, have openings in their lower area, which allow the impurity-laden coolant which has arrived in the labyrinth in the area behind the sealing lip and the opposing contact surface to run back out again from the labyrinth. Spray water originating from adjacent rolls can penetrate directly into this opening, at least in the area of the upper roll of a rolling stand, so that the neck seal situated behind it is exposed to a disproportionate amount of dirty coolant.

SUMMARY OF THE INVENTION

The invention is based on the task of providing a sealing device in which the sealing lip of the ring seal is exposed to almost no impurity-laden coolant, which has a longer life-span, and which prevents spray water from penetrating into the drain openings. The invention is also based on the task of increasing the life-span of the opposing contact surface assigned to the ring seal.

To accomplish this task, it is proposed that a ring profile with an L-shaped cross section be permanently connected by its first sidepiece to the end surface of the roll; that the sealing lip rest on certain areas of the first sidepiece; that the second sidepiece of the L-shaped ring profile extend over the ring seal and part of the ring-like extension, leaving a small gap, thus sealing them off toward the barrel of the roll; and that the ring-like extension be provided with a drain groove, open to the outside, on its external surface.

Because the sealing lip rests on the first sidepiece of the L-shaped ring profile, the end surface of the roll is not subject to wear. The second sidepiece, which extends over the ring seal and part of the ring-like extension, guarantees that the impurity-laden coolant cannot arrive directly at the ring seal. As a result of the small gap between the second sidepiece and the ring-like extension, a type of labyrinth is formed, by means of which hardly any impurity-laden coolant can arrive at the ring seal. So that no impurity-laden coolant can back up in front of the entrance to the labyrinth formed between the second sidepiece and the ring-like extension, a drain groove is provided here, via which the impurity-laden coolant can flow away before it can enter the labyrinth.

It is advantageous here for the second sidepiece to cover the ring-like extension all the way to the drain groove, so that the impurity-laden coolant can arrive directly in the drain groove, without previously standing in front of the entrance to the labyrinth. It is also advantageous for the gap between the ring-like extension and the second sidepiece to be only about 0.5-1.5 mm. This gap guarantees that the offset which rolls must have can still be provided, while at the same time the labyrinth is kept as narrow as possible, as a result of which the impurity-laden coolant has only the narrowest possible route available to it.

If the second sidepiece, which rotates with the roll, has at least one separator edge at its end, it is ensured even more reliably that the impurity-laden coolant can be flung off by the sidepiece and not arrive in the labyrinth but rather in the drain groove.

It has been found effective for the L-shaped ring profile to be given a surface treatment in the form of a hardening treatment or a coating. A rolling operation, for example, can harden certain areas of the surface, and at the same time the peaks which may have been formed on the surface during the production of the profile are also removed, so that the sealing lip interacts with the smoothest possible contact surface. Hardening the surface achieves the goal of giving the L-shaped ring profile a long service life.

Subjecting the L-shaped ring profile to plasma-nitriding gives it even greater hardness. Through controlled oxidation, the goal is achieved that all of the free bonds of the molecules in the surface area of the L-shaped ring profile are occupied by oxygen atoms, so that the L-shaped ring profile cannot undergo any further oxidation later.

If a lubricant reservoir which is able continuously to dispense small amounts of lubricant via suitable channels to the point between the sealing lip of the ring seal and the first sidepiece of the L-shaped profile is assigned to the L-shaped ring profile or to the end surface of the roll, both the sealing lip and the L-shaped ring profile can be given an even longer service life.

The invention is explained in greater detail on the basis of a drawing. The drawing shows a roll 1 with a roll neck 2, on which a neck bush 3 is nonrotatably mounted. The roll bush 3 holds a ring-shaped neck seal 4 in position. The stationary bearing housing 5 carries the bearing bush 6. A ring-like extension 7 is permanently mounted on the bearing housing 5; this extension holds in turn a ring seal 8. The ring-like extension 7 has a drain groove 9, in which impurity-laden coolant can collect and flow to the bottom of the ring-shaped drain groove.

A ring profile 11 with an L-shaped cross section, comprising a first sidepiece 12 and a second sidepiece 13, is mounted on the end surface 10 of the roll 1. The first sidepiece 12 is permanently connected by screws 14 to the end surface 10. The second sidepiece 13 is a certain distance above the ring seal 8 and part of the ring-like extension 7, so that the impurity-laden coolant coming from the roll 1 cannot reach the ring seal 8 and is instead guided to the drain groove 9.

So that the impurity-laden coolant cannot pass around the second sidepiece 13 and arrive in the labyrinth 15 formed here, the second sidepiece 13 has a separator edge 16, which, while the second sidepiece 13 is turning, ensures an even more reliable separation of the impurity-laden coolant.

DETAILED DESCRIPTION OF THE INVENTION

Figure 1:
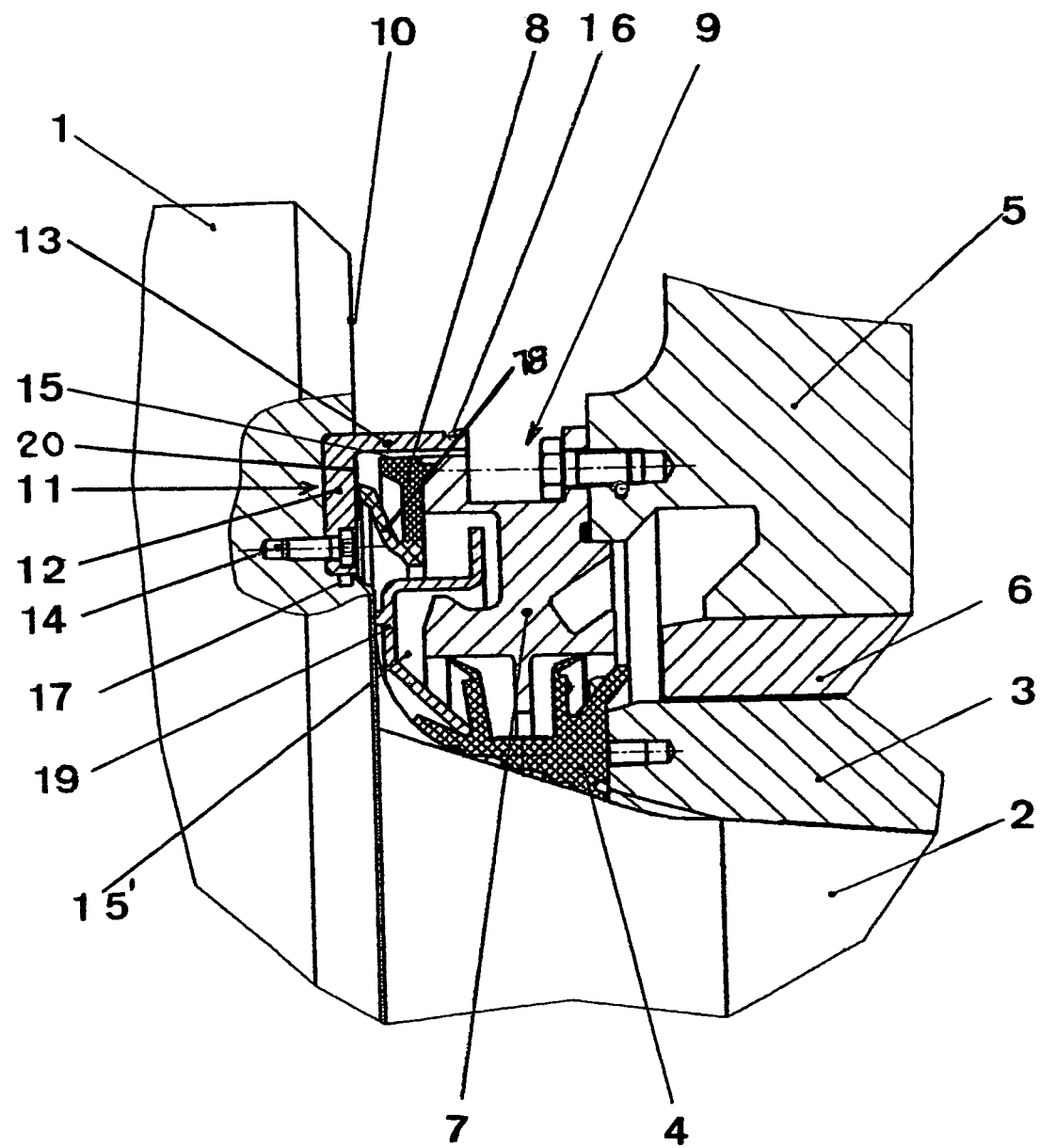
FIG. 1 is a section through a sealing device pursuant to the present invention.

In the area of the first sidepiece 12 and the end surface 10, a lubricant reservoir 17 is provided, from which lubricant can travel to the contact surface between the sealing lip 18 and the first sidepiece 12. An appropriate lubricating action is thus provided, which also helps to increase the life-span of the seal. An area 20 of the first sidepiece 12, which is in contact with the sealing lip 18, is at least one of hardened and subjected in certain areas to at least one of plasma nitriding and controlled oxidation.

Between the ring seal 8 and the neck seal 4, another ring-shaped profile 19 is provided to ensure that a labyrinth 15' with the greatest possible number of turns is formed.

LIST OF REFERENCE NUMBERS

1 roll
2 roll neck
3 neck bush
4 neck seal
5 bearing housing
6 bearing bush
7 ring-like extension
8 ring seal
9 drain groove
10 end surface
11 L-shaped profile
12 first sidepiece
13 second sidepiece
14 screw
15 labyrinth
16 separator edge
17 lubricant reservoir
18 sealing lip
19 ring-shaped profile

The invention claimed is:

1. Roll bearing sealing device, comprising: a ring-like extension connected to a bearing housing (5); a ring seal (8) permanently connected to the ring-like extension (7); a neck seal (4) preceded on a roll barrel side by the ring seal (8), the ring seal having a sealing lip (18); and a ring profile (11) with an L-shaped cross section is permanently connected by a first sidepiece (12) to an end surface (10) of a roll (1), the sealing lip (18) being arranged to rest on certain areas of the first sidepiece (12) with sealing contact, and a second sidepiece (13) of the L-shaped ring profile (11) extends over the ring seal (8) and part of the ring-like extension (7) so as to leave a slight gap and seal off the ring seal (8) and the ring-like extension (7) from the barrel of the roll, the ring-like extension (7) having a drain groove (9) on an external surface of the ring-like extension (7), the drain groove (9) being open radially outward, an area of the first sidepiece (12) in contact with the sealing lip (18) is at least one of hardened and subjected in certain areas to at least one of plasma nitriding and controlled oxidation.

2. Roll bearing sealing device according to claim 1, wherein the second sidepiece (13) covers the ring-like extension (7) all the way to the drain groove (9).

3. Roll bearing sealing device according to claim 1, wherein the gap between the ring-like extension (7) and the second sidepiece (13) is approximately 0.5-1.5 mm.

4. Roll bearing sealing device according to claim 1, wherein the second sidepiece (13) has at least one separator edge (16) in the area of its free end.

5. Roll bearing sealing device according to claim 1, wherein at least one lubricant reservoir (17) is assigned at least one of to the end surface (10) of the roll (1) and to the first sidepiece (12), and a connection exists between the lubricant reservoir (17) and the contact area of the sealing lip (18) with the first sidepiece (12).

\* \* \* \* \*